Figure 4:
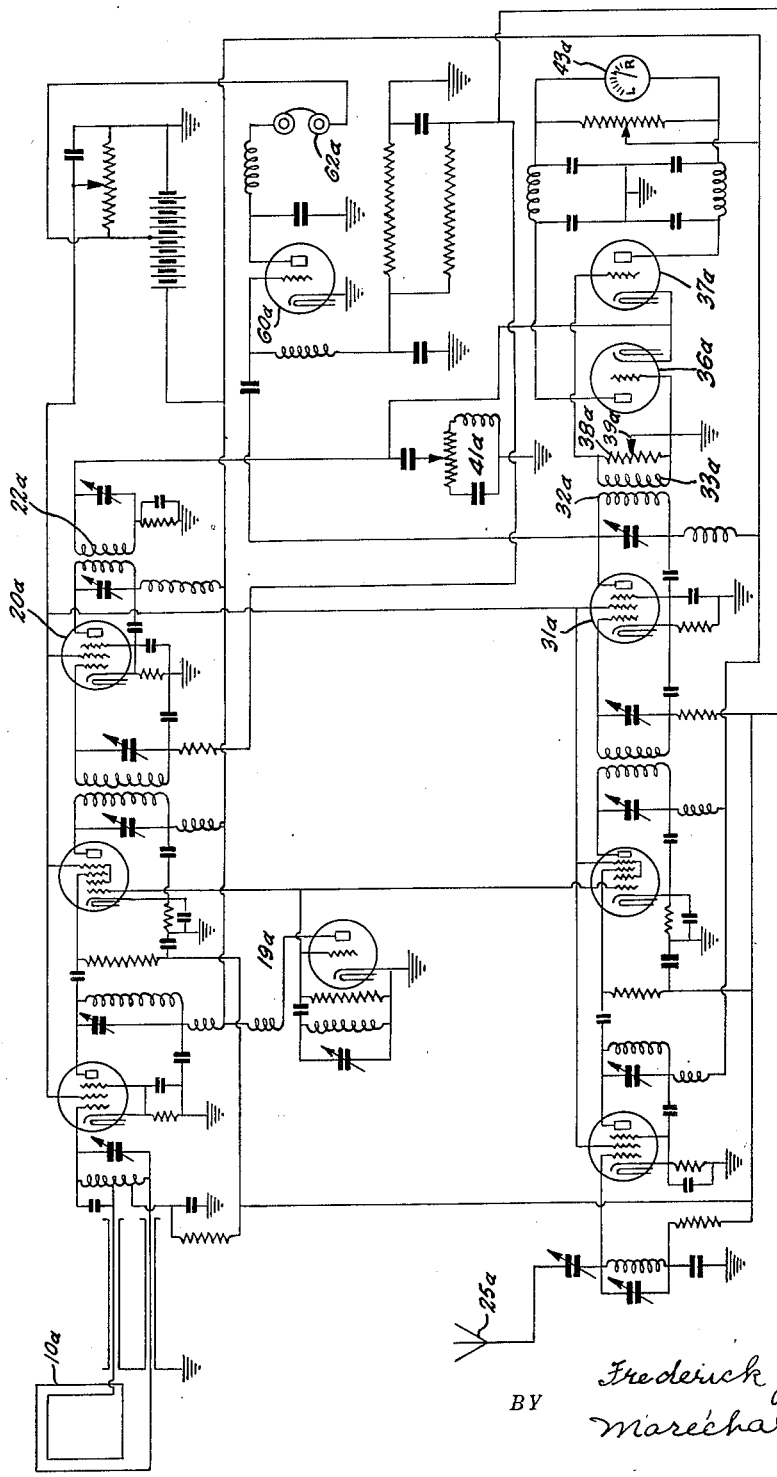

Feb. 8, 1938.   F. J. HOOVEN   2,107,633
DIRECTION FINDER
Filed March 4, 1935   2 Sheets-Sheet 1
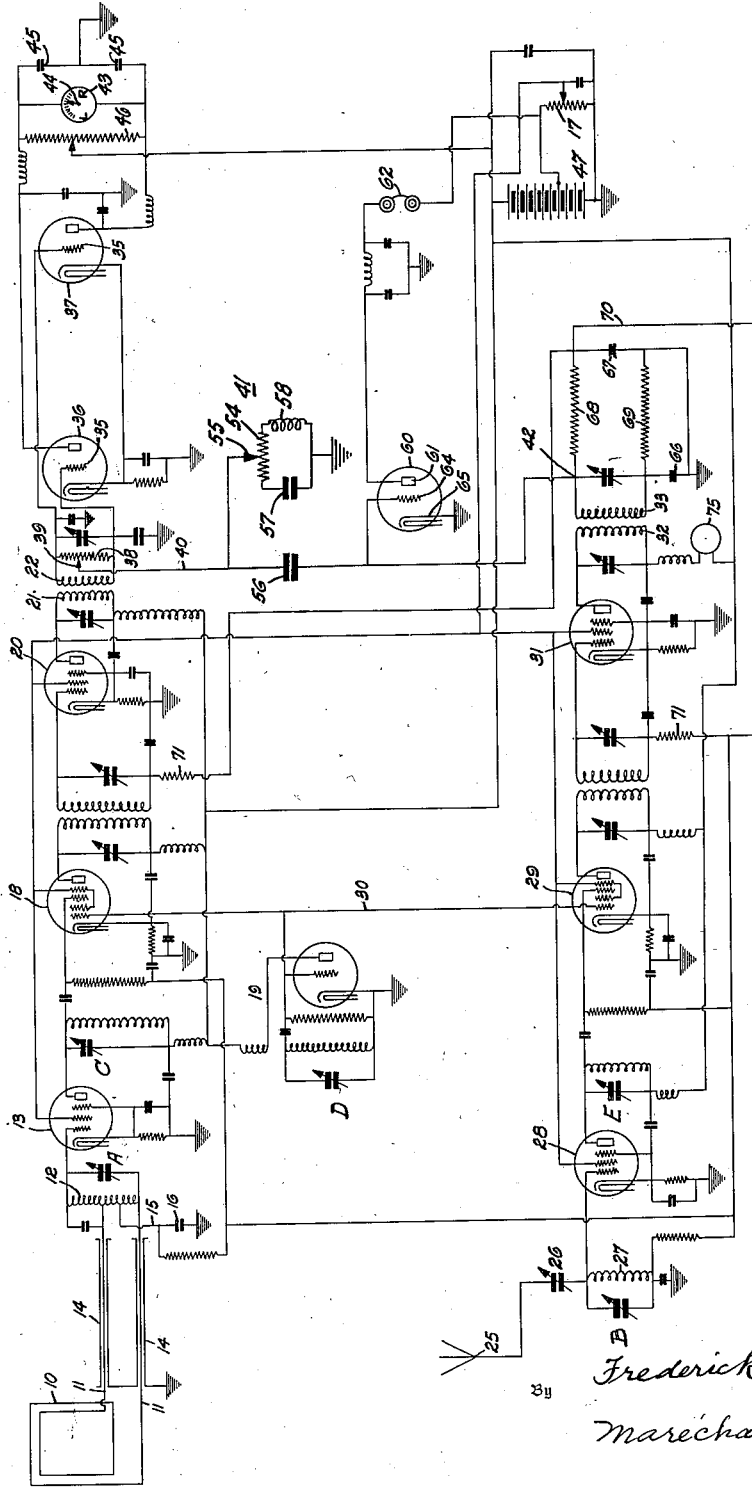
Inventor
Frederick J. Hooven
By Marechal & Noé
Attorney Feb. 8, 1938.    F. J. HOOVEN    2,107,633
DIRECTION FINDER
Filed March 4, 1935    2 Sheets-Sheet 2

INVENTOR
Frederick J. Hooven
BY Maréchal & Noé
ATTORNEY

Patented Feb. 8, 1938

2,107,633

UNITED STATES PATENT OFFICE 2,107,633

DIRECTION FINDER

Frederick J. Hooven, Dayton, Ohio

Application March 4, 1935, Serial No. 9,184

19 Claims. (Cl. 250—11)

This invention relates to direction finding apparatus and more particularly to a receiving apparatus adapted for use on airplanes and the like for indicating the direction of movement to a desired objective.

For a more complete understanding of the direction finding apparatus to which my present invention is applicable, reference is made to my Letters Patent 2,062,906, granted December 1, 1936, based on application Serial No. 718,959, filed April 4, 1934 for Direction finder and over which my present invention is an improvement.

One object of the invention is the provision of a receiving apparatus which will enable the pilot of an aircraft or other moving body to follow a predetermined course, the apparatus being of comparatively simple construction but designed to operate with unusual accuracy.

Another object of the invention is the provision of a direction finding receiving apparatus embodying receiving circuits connected respectively to directional and non-directional antennae, the received signals being amplified separately and then impressed on a pair of rectifiers, a single coil carrying the entire output of one amplifier circuit and being symmetrically connected to both rectifiers so as to provide for accurate operation.

Another object of the invention is the provision of a direction finding receiving apparatus of the character mentioned having means that does not require adjustment in operation for neutralizing the effect of non-directive signals received by the directional antenna or its connections to the directional antenna receiving circuit.

Another object of the invention is the provision of a direction finding receiving apparatus of the character mentioned adapted for separately amplifying and then mixing the signals coming in through the directional and non-directional antennae, and incorporating an adjustable phase shifting device adapted to bring the components of the mixed signals more into alignment and thus provide a very substantial increase in the sensitivity of the device.

Other objects and advantages of the invention will be apparent from the following description, the appended claims and the accompanying drawings, in which,—

Fig. 1 is a diagrammatic showing of one form of direction finding receiving apparatus embodying the present invention;

Fig. 2 diagrammatically illustrates the result attained by the phase shifting device;

Fig. 3 is a view illustrating the interconnections of the several adjustable tuning condensers; and Fig. 4 is a diagrammatic view of a modified form of the direction finding apparatus.

Referring to the drawings by reference numerals, the apparatus shown is a direction finding receiving apparatus such as may be carried on an aircraft or other moving vehicle and which is adapted to enable the aviator or pilot to readily determine whether or not he is on his course and flying toward a radio transmitter of known location.

As shown in Fig. 1, the receiving apparatus comprises a directional antenna such as the loop 10, opposite sides of which are connected by wires 11 to an auto-transformer coil 12 which is provided in the input circuit of a radio frequency amplifier tube 13. The wires 11 extend through a metal pipe or pipes 14 which are grounded so that these wires 11, which may be quite long, are prevented from acting as a non-directional receiver. The capacity path to ground provided by reason of the pipes 14 also serves to balance out, at least to some extent, any signals coming from the loop and which are received by the loop as a non-directional receiving device.

The wires 11 extend to two spaced points on the auto-transformer coil 12 near one end of the coil, thus creating a difference in potential between opposite ends of the coil for the transmission of signals to the tube 13. Midway between the two points of connection of the wires 11 the coil 12 is connected to ground by the wire 15 and the comparatively large size condensers 16. The grounded connection of the mid-point between the wires 11 provides a low resistance path to ground for any signals of a non-directive character coming through the wires 11. Thus by reason of the shielding pipes 14 and the grounded connection wire 15 all the signals imparted to the tube 13 are of a directional character,—that is, signals received by the loop acting as a pure directional receiver. The loop 10 is preferably arranged transversely of the line of forward flight so that the loop does not receive signals coming from the direction in which the aircraft is flying, but as soon as the aircraft deviates from its predetermined course, the loop will become more or less effective in receiving the signals from the transmission point on the ground in accordance with the deviation of the plane containing the loop from the transverse plane.

The signal received by the loop is amplified at the received radio frequency by means of the amplifying tube 13. The output of tube 13 is impressed on a modulator tube 18 and combined there with oscillations of a frequency differing from and preferably somewhat higher than the signal frequency by a fixed value, produced by an oscillator 19 of any suitable character, thus providing beat frequency oscillations of a fixed predetermined frequency. The beat frequency oscillations thus produced are further amplified by amplifying tube 20, the output of tube 20 passing through the primary winding 21 of a transformer, the secondary of which is indicated at 22.

The aircraft is also provided with a non-directional antenna 25 connected through an adjustable condenser 26, tuning condenser B and a conductive winding 27 to ground and to the input element of a radio frequency amplifying tube 28 which amplifies the non-directive signals coming in over the antenna 25 at radio frequency. The output of tube 28 is connected electrically to the input element of the modulating tube 29 where it is combined with the oscillations generated by oscillator 19, which is similarly connected througn the wire 30 to electrodes of the two tubes 18 and 29. The amplified beat signal produced in tube 29 is further amplified by amplifying tube 31, the output of which passes through the primary winding 32 of a transformer having a secondary winding as indicated at 33. A variable screen voltage is provided for the various tubes by means of a manually controllable potentiometer 17 connected to the battery as a means for controlling the gain of the tubes.

As will now be apparent the directional signals received by the loop and the non-directional signals received by the antenna 25 are separately amplified and combined similarly with the same radio frequency heterodyning oscillations produced by the oscillator 19, the comparatively low frequency beat signals thus produced being further separately amplified to bring the signals up to a suitable value. As shown, suitable tuning means are provided for the receiving circuits and for the oscillator, the several tuning means such as the condensers A, B, C, D, and E being adapted for simultaneous operation so that when the loop and antenna circuits are tuned to any desired frequency of some transmitted oscillations, the oscillator 19 will also be adjusted to give some predetermined frequency value in the modulator tubes in which the beat frequency signals are increased.

The amplified beat signal from the directional antenna circuit received by the transformer secondary 22 is impressed in opposed phase relation on the input elements 35 of the two rectifiers 36 and 37, one side of the winding 22 being connected to one tube while the other side is connected to the other tube. Connected in parallel with the winding 22 is a high resistance 38 having an adjustable center tap 39 connected by wire 40 and a phase shifting device 41 to one end 42 of the winding 33. The other side of the winding 32 is connected to ground. The winding 33 carries the entire amplified output of the non-directional antenna circuit, impressing this output equally and in the same phase relation on the input elements 35 of the rectifier tubes 36 and 37, the adjustable mid point contact 39 being set so as to electrically equalize the signals impressed on the two rectifier tubes 36 and 37. One of these rectifier tubes is therefore energized by the vector sum of the beat frequency signals coming from the amplifier circuits of the directional and non-directional antennae, while the other rectifier is energized by the vector difference of the signals. Thus when the loop is transversely arranged with respect to a line leading therefrom to the source of broadcast oscillations the vector sum and the vector difference will be equal, but if the line of flight deviates from the intended course so that the loop is not exactly transverse with respect to the direction from which the signals are coming a voltage differential would be produced on the output elements of the rectifier tubes, the differential being indicated by a meter 43 such as a differential galvanometer, having a needle 44 adapted to swing to either side of a zero position depending upon the direction of current flow. Opposite sides of the galvanometer are connected to two condensers 45 of equal value and to opposite sides of a high resistance winding 46, the electrical center point of which is adjustably connected to the battery 47. Opposite sides of the winding 46 are also connected similarly to the anodes or output elements of the tubes 36 and 37 as shown.

Inasmuch as the signals received by the loop and by the non-directional antennae are separately amplified and thereafter properly joined and impressed on the rectifiers to give a vector sum and a vector difference in the two rectifiers, any difference in the amplification factors of the amplifier tubes will be a matter of no consequence as the power of the signals coming from the winding 33 does not have to be any particular value with respect to the power of the signal coming from the winding 22. If, however, the signals should be added together and then amplified, a difference in the amplification factors of the amplifier tubes would create an error producing a deflection of the needle of the galvanometer even with no power input on the loop, since in this case it would be a different amplification of the components of the same thing that would be involved. To prevent any error arising such as would tend to unbalance the power inputs of the two rectifiers at a time when no power is received by the loop the coil 33 is a single winding operating in common through connections to the two grids of the two rectifiers, thus avoiding any errors that would be created by employing two different windings separately connected to the two rectifiers in place of the single winding 33, in which any difference in impedance would be productive of an error in the galvanometer indications.

Signals received by the loop receiving circuit have a displacement of about 90 degrees with respect to the signals received in the non-directional receiving circuit. The phase displacement is indeterminate and variable in the associated amplifiers. If the values of the various tuning impedances are not fixed with great precision there is considerable and erratic variations in the phase displacement over the tuning range. Thus the signals imparted to the two windings 22 and 33 may be relatively displaced as indicated in Fig. 2 and as shown in solid lines. It is only the "in" phase components of these two signals that can be effective on the rectifiers, and to bring the two currents 49 and 50 more in phase with one another in compensation for unknown phase changes, produced by the fixed frequency amplifiers and to compensate for any errors in proportioning of the variable frequency tuning impedances, adjustable means such as the phase shifting device 41 is employed in the connection which provides for the mixing of the two signals. This brings the signal 49 into the position shown in dotted lines in Fig. 2 so that the vector sum 51 will be considerably different in value from the vector difference 52. The construction permits the phase angle to be reduced to zero if desired. The phase shifting device preferably comprises a potentiometer resistance element 54 having an adjustable contact 55 connected through condenser 56 to point 42. The opposite ends of resistance element 54 are connected respectively to a condenser 57 and inductance 58 which are connected to ground. Adjustment of the degree of phase displacement is accomplished by sliding the potentiometer contact 55. The result of the phase shifting device is that the signal received by the non-directional antenna circuit and then amplified after being heterodyned with the oscillations generated in the oscillator 19 is shifted into a more general alignment with the signals produced in the windings 22, thus very materially increasing the sensitivity of the indication obtainable on the galvanometer. This is of considerable importance considering the fact that the correct position of forward flight is to be determined when the loop is arranged transversely with respect to the path of the broadcast signals and when the loop is in this position the signal value received by the loop is a minimum.

Connected to one end of the winding 33, as at 42, is a detector tube 60 having an output element 61 connected to a pair of receiving devices such as the ear phones 62 so that the pilot can listen to the speech or sound broadcast from the station toward which he is flying and so that he can readily tune in the receiving circuits for any particular station. The power is supplied to the detector 60 from the amplifier circuit of the non-directional antenna so that the signals will be perceptible in the earphones 62 at all times, and so as not to unbalance the power supply to the rectifiers 36 and 37 from the amplifier circuit of the directional antenna.

The received signal coming from the non-directional antenna circuit is impressed across the grid 64 and the cathode 65 of the detector tube 60 which rectifies the received signal. The signal impressed on the tube, in flowing between the cathode and the grid and through the winding 33 and the condenser 66 serves to charge a condenser 67 connected across impedances 68 and 69, thus energizing the condenser 67, which provides a grid bias through the connection 70 and impedances 71 to the grids of all the amplifying tubes. Thus the amplifying circuits of the directional and of the non-directional antenna are controlled automatically in such a way that normally with a received signal of minimum intensity the grid bias is such as to increase to a maximum the amplification powers of the circuits. However, when the signal of high value is impressed on the non-directional aerial and a substantial flow of power takes place between the grid 64 and the cathode 65 the grid bias is automatically changed for the various amplifying tubes, to cut down the amplification factors of the tubes. The power outputs of the amplifying tubes 20 and 31 are thus equally changed in a manner inversely in accordance with the power of the signals received by the non-directional antenna. This provides for a substantial swing of the needle of the galvanometer even though the airplane may be far from the transmitting station and the receiving signals quite weak. When the airplane is close to the transmitting station and the signals are quite powerful the automatic volume control automatically cuts down the power supplied to the two rectifiers 36 and 37 so that an excessive amount of movement of the galvanometer needle does not obtain. The amount of deflection of the galvanometer needle will therefore serve as a rough indication of the amount of turn required to bring the aircraft back on its course if the pilot has an approximate idea as to the distance between the aircraft and the transmitting station. To give the pilot an idea as to his distance from the station an indicator or galvanometer 75 is connected in the plate circuit of the amplifier tube 31, the deflection of its needle being in accordance with the amount of direct current flow in the plate circuit and this is in turn dependent upon the amount of grid bias of the amplifier tubes.

The use of a heterodyne system embodying a common oscillating circuit equally effective on the signals received by the non-directional antenna and on the signals received by the directional antenna provides an extremely sensitive and accurate apparatus permitting a high degree of amplification of the received signals, with comparatively few tuning devices, and cooperates with the phase shifting device 41 by means of which the relative values of the vector sum and the vector difference of the signals is greatly increased. In accordance with the present invention the loop is prevented from acting as a non-directional receiver. It will, therefore, be apparent that the apparatus is adapted for very sensitive operation but is extremely reliable, avoiding errors and at the same time not requiring apparatus that must be extremely carefully made or carefully adjusted after being made.

In the form of construction above described, and as shown in Fig. 1 of the drawings, the signal coming from the loop is applied to the two detectors or rectifiers 36 and 37 in opposed phase relationship, but if desired the signals coming from the loop circuit can be applied to the detectors in like phase relationship while the signals coming from the non-directional circuit are applied in opposing phase relationship, as shown in the modified form of construction represented by Fig. 4. As shown in Fig. 4, the directional antenna 10a and the non-directional antenna 25a are connected to the tubes 20a and 31a respectively in the same manner as in the construction shown in Fig. 1, the signals directionally received by the loop and the non-directional signals received by the loop antenna 25a being separately amplified and combined similarly with the same radio frequency heterodyning oscillations produced by the oscillator 19a. The comparatively low beat signals thus produced are further amplified to bring the signals up to a suitable value.

The amplified beat signal from the directional antenna circuit received by the transformer secondary 22a is impressed in like phase relation on input elements such as the cathodes of the two rectifiers 36a and 37a. These rectifiers are also connected as by means of their grid elements, to opposite sides of the secondary 33a, across which is a high resistance 38a having an adjustable center tap 39a which is connected to ground as shown. The phase shifter 41a is connected to the winding 22a so as to vary the phase relation of the amplified signals of the non-directional antenna with respect to the amplified signals of the directional antenna, the construction of the phase shifting apparatus being the same as the form of construction first described.

The detector tube 60a which is connected to the receiving device or ear phones 62a is connected in the non-directional circuit, preferably to the primary winding 32a and the plate of the tube 31a so that the power required for operation of the ear phones comes from the antenna 25a. The meter 43a and its connections to the tubes 36a and 37a, and the connections of the battery and automatic volume control are similar to the form of construction first described as will be apparent from the drawings.

This form of construction has the advantage that the adjustable contact 39a can be so set as to exactly balance the outputs of the detectors or rectifiers 36a and 37a with respect to any signals coming from the non-directional antenna 25a, and as these signals are of considerably greater power than the signals coming in through the loop circuit the provision of the resistance 38a and its controllable center contact permits an exact regulation of the signals imparted to the two rectifier tubes so that if they should be of slightly different efficiency or amplification factor their effect on the meter 43 may be exactly neutralized.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A direction finding receiving apparatus comprising a receiving circuit connected to a directional antenna, a receiving circuit connected to a non-directional antenna, amplifier circuits for separately amplifying the signals in said receiving circuits, an oscillator coacting with each of said amplifier circuits for producing therein a beat frequency, a pair of rectifiers, an indicator for indicating the current differential in the output of said rectifiers, connections from the input sides of said rectifiers to one of said amplifier circuits, a phase determining network disposed in said connections to thereby impress the amplified beat frequency signal of said one amplifier circuit in opposing phase relationship on the rectifiers, means for impressing the amplified beat frequency signal of the other amplifier circuit in like phase relationship in the rectifiers, and means for controlling the phase relationship of the amplified beat frequency signals of the non-directional antenna circuit with respect to the amplified beat frequency signals of the directional antenna circuit.

2. A direction finding receiving apparatus comprising a receiving circuit connected to a directional antenna, a receiving circuit connected to a non-directional antenna, amplifier circuits for separately amplifying the signals in said receiving circuits, an oscillator coacting with each of said amplifier circuits for producing therein a beat frequency, a pair of rectifiers, an indicator for indicating the current differential in the output of said rectifiers, connections from the input sides of said rectifiers to one of said amplifier circuits to thereby impress the amplified beat frequency signal of said one amplifier circuit in opposing phase relationship on the rectifiers, means for impressing the amplified beat frequency signal of the other amplifier circuit in like phase relationship in the rectifiers, means for controlling the phase relationship of the amplified beat frequency signals of the non-directional antenna circuit with respect to the amplified beat frequency signals of the directional antenna circuit, and means for adjusting the relative magnitudes of the components of the non-directional beat frequency signal applied to said rectifiers.

3. A direction finding receiving apparatus comprising a receiving circuit connected to a directional antenna, a receiving circuit connected to a non-directional antenna, amplifier circuits for separately amplifying the signals in said receiving circuits, an oscillator coacting with each of said amplifier circuits for producing beat frequencies therein, a pair of rectifiers, an indicator for indicating the current differential in the output of said rectifiers, connections from the input sides of said rectifiers to the amplifier circuit of the directional antenna for impressing its amplified beat frequency signal in opposing phase relationship on the rectifiers, means for impressing the amplified beat frequency signal of the non-directional antenna in like phase relationship on the rectifiers and comprising a single coil carrying the entire amplified beat frequency signal of the non-directional antenna and symmetrically connected to both rectifiers, and a controllable phase shifter for displacing the phase of the amplified beat frequency signal of the non-directional antenna circuit.

4. A direction finding receiving apparatus comprising a receiving circuit connected to a directional antenna, a receiving circuit connected to a non-directional antenna, amplifier circuits for separately amplifying the signals in said receiving circuits, an oscillator coacting with each of said amplifier circuits for producing beat frequencies therein, a pair of rectifiers, an indicator for indicating the current differential in the output of said rectifiers, connections from the input sides of said rectifiers to the amplifier circuit of the non-directional antenna for impressing its amplified beat frequency signal in opposing phase relationship on the rectifiers, means for impressing the amplified beat frequency signal of the directional antenna in like phase relationship on the rectifiers and comprising a single coil carrying the entire amplified signal of the directional antenna and symmetrically connected to both rectifiers, and a controllable phase shifter for displacing the phase of the amplified beat frequency signal of the non-directional antenna circuit.

5. A direction finding receiving apparatus comprising a radio frequency receiving circuit connected to a directional antenna, a radio frequency receiving circuit connected to a non-directional antenna, tuning means for said receiving circuits, amplifier circuits for separately amplifying the signals in said receiving circuits, an oscillator coacting with each of said amplifier circuits for producing beat frequencies therein, a pair of rectifiers, an indicator for indicating the current differential in the output of said rectifiers, connections from the input sides of said rectifiers to one of said amplifier circuits to thereby impress the amplified beat frequency signal of said one amplified circuit in opposing phase relationship on the rectifiers, means for impressing the amplified beat frequency signal of the other amplified circuit in like phase relationship on the rectifiers and comprising a single coil carrying the entire output of said other amplifier circuit, a phase shifter connected to said coil, and connections from said phase shifter symmetrically to both rectifiers.

6. A direction finding receiving apparatus comprising a radio frequency receiving circuit connected to a directional antenna, a radio frequency receiving circuit connected to a non-directional antenna, tuning means for said receiving circuits, amplifier circuits for separately amplifying the signals in said receiving circuits, an oscillator coacting with each of said amplifier circuits for producing beat frequencies therein, a pair of rectifiers, an indicator for indicating the current differential in the output of said rectifiers, connections from the input sides of said rectifiers to the non-directional amplifier circuit to thereby impress the amplified beat frequency signal of said circuit in opposing phase relationship on the rectifiers, means for impressing the amplified beat frequency signal of the other amplified circuit in like phase on the rectifiers, a phase shifter connected to said last means, connections from said phase shifter symmetrically to both rectifiers, and means for adjusting the relative magnitudes of the components of the non-directional beat frequency signal applied to said rectifiers.

7. A direction finding receiving apparatus comprising a radio frequency receiving circuit including a directional antenna, a second radio frequency receiving circuit including a non-directional antenna, an oscillator for generating oscillations, means for impressing said oscillations on both said receiving circuits for producing beat frequency oscillations therein, amplifiers for separately amplifying the beat frequency oscillations in said receiving circuits, a pair of rectifiers, means for indicating the current differentials in the output of said rectifiers, connections from said rectifiers to said amplifiers, a phase determining network disposed in said connections to impress the signals of one amplifier circuit in opposing phase relationship and the signals of the other amplifier circuit in like phase relationship on said rectifiers, and means for adjusting the phase relationship of the amplified beat frequency oscillations of the non-directional antenna circuit with respect to the beat frequency oscillations of the directional antenna circuit.

8. A direction finding receiving apparatus comprising a directional antenna, a receiving circuit connected therewith and including an input coil having spaced points connected to opposite sides of said directional antenna, a grounded connection effective midway between said spaced points to balance out non-directive signals received by said directional antenna, a non-directional antenna, amplifier circuits for separately amplifying the signals in said receiving circuits, an oscillator coacting with each of said amplifier circuits for producing beat frequencies therein, a pair of rectifiers, an indicator for indicating the current differential in the output of said rectifiers, connections from said rectifiers to said amplifier circuits, a phase determining network for impressing the beat frequency signals of one amplifier circuit in opposing phase relationship on said rectifiers, and means for impressing the beat frequency signals of the other amplifier circuit in like phase relationship on said rectifiers.

9. A direction finding receiving apparatus comprising a directional antenna, a receiving circuit connected therewith and including an input coil having a portion of said coil connected across said directional antenna, a grounded connection effective midway between its points of connection to said antenna to balance out non-directive signals received by said directional antenna, a non-directional antenna, amplifier circuits for separately amplifying the signals in said receiving circuits, an oscillator coacting with each of said amplifier circuits for producing beat frequencies therein, a pair of rectifiers, an indicator for indicating the current differential in the output of said rectifiers, connections from said rectifiers to said amplifier circuits, a phase determining network in said connections for impressing the beat frequency signals of one amplifier circuit in opposing phase relationship on said rectifiers, and means for impressing the beat frequency signals of the other amplifier circuit in like phase relationship on said rectifiers.

10. A direction finding receiving apparatus comprising a receiving circuit connected to a directional antenna, a receiving circuit connected to a non-directional antenna, amplifier circuits for separately amplifying the signals in said receiving circuits, means for deriving a beat frequency in each of said amplifier circuits, a pair of rectifiers, an indicator for indicating the current differential in the output of said rectifiers, connections from the input sides of said rectifiers to one of said amplifier circuits to thereby impress the beat frequency of the amplified signal of said one amplifier circuit in opposing phase relationship on the rectifiers, means for impressing the beat frequency of the amplified signal of the other amplifier circuit in like phase relationship on the rectifiers, a potentiometer for adjusting the relative magnitude of the components of the non-directional beat frequency signal applied to said rectifiers to increase one of such signals and to differentially decrease the other.

11. A direction finding receiving apparatus comprising a receiving circuit connected to a directional antenna circuit, an oscillator means coacting with said oscillator for producing a beat frequency in each of said receiving circuits, a receiving circuit connected to a non-directional antenna circuit, a pair of rectifiers, an indicator for indicating the current differential in the output of said rectifiers, connections from the input sides of said rectifiers to one of said receiving circuits to thereby impress the beat frequency of the signal of said one receiving circuit in opposing phase relationship on the rectifiers, means for impressing the beat frequency of the signal of the other receiving circuit in like phase relationship on the rectifiers, and means for controlling the phase relationship of the beat frequency signals of the non-directional antenna circuit with respect to the beat frequency signal of the directional antenna circuit.

12. A direction finding receiving apparatus comprising a receiving circuit connected to a directional antenna, a receiving circuit connected to a non-directional antenna, an oscillator coacting with each of said circuits, means for producing a beat frequency in each of the circuits, a pair of rectifiers, an indicator for indicating the current differential in the output of said rectifiers, connections from the input sides of said rectifiers to one of said receiving circuits to thereby impress the beat frequency signal of said one receiving circuit in opposing phase relationship on the rectifiers, means for impressing the beat frequency signal of the other receiving circuit in like phase relationship on the rectifiers, means for controlling the phase relationship of the beat frequency signals of the non-directional circuit with respect to the beat frequency signal of the directional antenna circuit, and means for differentially adjusting the relative magnitudes of the components of the non-directional beat frequency signal applied to said rectifiers.

13. A direction finding receiving apparatus comprising a receiving circuit connected to a directional antenna, a receiving circuit connected to a non-directional antenna, an oscillator coacting with each of said circuits, means for producing a beat frequency in each of said circuits, a pair of rectifiers, an indicator for indicating the current differential in the output for said rectifiers, connections from the input sides of said rectifiers to one of said receiving circuits to thereby impress the beat frequency signal of said one receiving circuit in opposing phase relationship on the rectifiers, means for impressing the beat frequency signal of the other receiving circuit in like phase relationship on the rectifiers, and means for controlling the phase relationship of the beat frequency signals of the non-directional circuit with respect to the beat-frequency signal of the directional antenna circuit, said last controlling means comprising an impedance of adjustable reactance forming a shunt connection to the output of said non-directional receiving circuit.

14. A direction finding receiving apparatus comprising a directional antenna, a receiving circuit connected therewith and including an input coil having spaced taps connected to opposite sides of said directional antenna, a grounded connection effective midway between said spaced taps to balance out non-directive signals received by said directional antenna, a non-directional antenna, a receiving circuit connected with said non-directional antenna, a pair of rectifiers, an oscillator coacting with each of said receiving circuits for producing a beat frequency therein, an indicator for indicating the current differential in the output of said rectifiers, connections from said rectifiers to said receiving circuits, a phase determining network in said connections for impressing the beat frequency signals of one receiving circuit in opposed phase relationship on said rectifiers, and means for impressing the beat frequency signals of the other receiving circuit in like phase relationship on the rectifiers.

15. A direction finding apparatus comprising a directional antenna circuit, a non-directional antenna circuit, a receiving circuit individual to each antenna circuit, a separate amplifier connected with each receiving circuit each including multiple electrode electron tubes, a high frequency oscillator, a connection between said high frequency oscillator and similar electrodes in each of said electron tubes, said oscillator coacting with said receiving circuits for producing a beat frequency therein, a pair of rectifiers, an indicator for indicating the current differential in the output of said rectifiers, connections from the input sides of said rectifiers to one of said receiving circuits, a phase determining network included in said connections to thereby impress the beat frequency of the signal of said one receiving circuit in opposing phase relationship on the rectifiers, means for impressing the beat frequency of the signal of the other receiving circuit in like phase relationship on the rectifiers, and means for controlling the phase relationship of the beat frequency signals of the non-directional antenna circuit with respect to the beat frequency signal of the directional antenna circuit.

16. A direction finding apparatus comprising a directional antenna circuit, a non-directional antenna circuit, a receiving circuit individual to each of said antenna circuits, a separate amplifier connected with each receiving circuit, each including multiple grid electron tubes, a high frequency oscillator, a connection between said high frequency oscillator and a grid electrode in one of the multiple grid electron tubes in each of said amplifiers, said oscillator coacting with said receiving circuits for producing a beat frequency therein, a pair of rectifiers, an indicator for indicating the current differential in the output of said rectifiers, connections from the input sides of said rectifiers to one of said receiving circuits, a phase determining network included in said connections to thereby impress the beat frequency of the signal of said one receiving circuit in opposing phase relationship on the rectifiers, means for impressing the beat frequency of the signal of the other receiving circuit in like phase relationship on the rectifiers, and means for controlling the phase relationship of the beat frequency signals of the non-directional antenna circuit with respect to the beat frequency signal of the directional antenna circuit.

17. A direction finding apparatus comprising a directional antenna circuit, a non-directional antenna circuit, a receiving circuit individual to each of said antenna circuits, a separate amplifier connected with each of said receiving circuits, said amplifiers comprising a plurality of electron tubes each having a cathode, a control grid, an anode and a screen grid electrode, a high frequency oscillator, a connection between said high frequency oscillator and said amplifiers, said oscillator coacting with said receiving circuits for producing a beat frequency therein, a pair of rectifiers, an indicator for indicating the current differential in the output of said rectifiers, connections from the input sides of said rectifiers to one of said receiving circuits to thereby impress the beat frequency of the signal of said one receiving circuit in opposing phase relationship on the rectifiers, means for impressing the beat frequency of the signal of the other receiving circuit in like phase relationship on the rectifiers, means for controlling the phase relationship of the beat frequency signals of the non-directional antenna circuit with respect to the beat frequency signal of the directional antenna circuit, and means for simultaneously adjusting the potential supplied to each of the screen grid electrodes of the tubes constituting said amplifiers.

18. A direction finding receiving apparatus comprising a receiving circuit connected to a directional antenna circuit, an oscillator means for producing a beat frequency in each of said receiving circuits, a receiving circuit connected to a non-directional antenna circuit, a pair of rectifiers, an indicator for indicating the current differential in the output of said rectifiers, connections from the input sides of said rectifiers to one of said receiving circuits to thereby impress the beat frequency of the signal of said one receiving circuit in opposing phase relationship on the rectifiers, means for impressing the beat frequency of the signal of the other receiving circuit in like phase relationship on the rectifiers, and means comprising a closed circuit constituted by resistance, capacity and inductance disposed in series and differentially connected with said rectifiers for controlling the phase relationship of the beat frequency signals of the non-directional antenna circuit with respect to the beat frequency signal of the directional antenna circuit.

19. A direction finding receiving apparatus comprising a receiving circuit connected to a directional antenna circuit, an oscillator means for producing a beat frequency in each of said receiving circuits, a receiving circuit connected to a non-directional antenna circuit, a pair of rectifiers, an indicator for indicating the current differential in the output of said rectifiers, connections from the input sides of said rectifiers to one of said receiving circuits to thereby impress the beat frequency of the signal of said one receiving circuit in opposing phase relationship on the rectifiers, means for impressing the beat frequency of the signal of the other receiving circuit in like phase relationship on the rectifiers, and means comprising a closed path constituted by resistance, capacity and inductance disposed in series, a connection intermediate said capacity and inductance with one side of said rectifiers and an adjustable tap on said resistance with the other side of said rectifiers for controlling the phase relationship of the beat frequency signals of the non-directional antenna circuit with respect to the beat frequency signal of the directional antenna circuit.

FREDERICK J. HOOVEN.